United States Patent
Tommy et al.

(10) Patent No.: US 11,069,108 B2
(45) Date of Patent: Jul. 20, 2021

(54) METHOD AND SYSTEM FOR CREATING AN INTELLIGENT CARTOON CHAT STRIP BASED ON DYNAMIC CONTENT

(71) Applicant: Tata Consultancy Services Limited, Mumbai (IN)

(72) Inventors: Robin Tommy, Thiruvananthapuram (IN); Anita Pramod Nanadikar, Thiruvananthapuram (IN); Anil Kumar Sharma, Thiruvananthapuram (IN); Aswathy Sreelekha Krishna, Thiruvananthapuram (IN); Rinu Michael, Thiruvananthapuram (IN); Mridul Sharma, Thiruvananthapuram (IN); Akhil Guthula, Thiruvananthapuram (IN); Gireesh Venkataraghavendra Bandlamudi, Thiruvananthapuram (IN); Sayan Das, Thiruvananthapuram (IN); Navin Infant Raj, Thiruvananthapuram (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/813,150

(22) Filed: Mar. 9, 2020

(65) Prior Publication Data

US 2021/0125389 A1  Apr. 29, 2021

(30) Foreign Application Priority Data

Oct. 23, 2019  (IN) .............. 201921043156

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00711* (2013.01); *G10L 15/063* (2013.01);
(Continued)

(58) Field of Classification Search
CPC ....... G06T 11/60; G06T 13/205; G06T 13/40; G06T 13/80; G10L 15/22; G10L 15/063;
(Continued)

(56) References Cited

U.S. PATENT DOCUMENTS 8,224,652 B2  7/2012  Wang et al.
9,106,812 B1  8/2015  Price et al.
(Continued)

FOREIGN PATENT DOCUMENTS

KR  2004-0091331  10/2004

*Primary Examiner* — Jeffery A Brier
(74) *Attorney, Agent, or Firm* — Finnegan, Henderson, Farabow, Garrett & Dunner, LLP

(57) ABSTRACT

A system and method to create an intelligent cartoon comic strip based on the dynamic content. Herein, the input is conversation-based text or speech files. The system identifies scenes, objects, sequence and flow for generating the comic strip along with gender of characters appearing in the entire conversation. Text is analyzed to create the situational based background image for the scenes that needs to be rendered. Emotion and placement of characters in the scene is decided by the NLP algorithms along with voice emotional and sentimental analysis. Characters are placed in plain canvas and then text dialog is embedded into corresponding text bubbles. Once this image is obtained, it is overlaid on top of the background based on the context. Further, the scenes are joined into a strip of images in a pattern, which depends on the number, and order of scenes, which is decided, based on the input.

11 Claims, 2 Drawing Sheets

(51) Int. Cl.
*G10L 15/06* (2013.01)
*G10L 15/18* (2013.01)
*G10L 15/22* (2006.01)
*G10L 25/63* (2013.01)

(52) U.S. Cl.
CPC .......... *G10L 15/1815* (2013.01); *G10L 15/22* (2013.01); *G10L 25/63* (2013.01)

(58) Field of Classification Search
CPC .. G10L 25/63; G10L 15/1815; G06K 9/00711
See application file for complete search history.

(56) References Cited

U.S. PATENT DOCUMENTS

| | | |
|---|---|---|
| 9,973,456 B2 | 5/2018 | Perigault |
| 2011/0283865 A1* | 11/2011 | Collins ............... G06F 3/04817 84/464 R |
| 2018/0144524 A1* | 5/2018 | Lotto .................... G06Q 10/10 |
| 2020/0097569 A1* | 3/2020 | Sewak .................. G06F 16/739 |

\* cited by examiner

METHOD AND SYSTEM FOR CREATING AN INTELLIGENT CARTOON CHAT STRIP BASED ON DYNAMIC CONTENT

CROSS-REFERENCE TO RELATED APPLICATIONS AND PRIORITY

This U.S. patent application claims priority under 35 U.S.C. § 119 to India Application No. 201921043156, filed on Oct. 23, 2019. The entire contents of the abovementioned application are incorporated herein by reference.

TECHNICAL FIELD

The disclosure herein generally relates to a field of artificial intelligence for creating an intelligent cartoon comic strip, more particularly, a system and method for creating a cartoon comic strip based on a dynamic content.

BACKGROUND

Traditionally, generation of comic strips require manual effort. In existing solutions, selection of characters based on the textual content. Hence, context, description and flow is not available. However, the users are provided with the option of selecting their own preferred character, but more time is involved in the user choice and the flexibility of randomness of the character is limited, i.e. the user can be provided only with the limited selection of avatar. This affects the user experience and interface.

In the existing solutions, dynamic environment creation based on the context, content, description and flow is not available. Background of the conversation is either kept constant or white plain screen. Sometimes it is given to the user to select and customize the scenario of the conversation. Further, the absence of a system with emotion detection from the dialog flow and character appearance change based on the emotion and sentimental value of the dialog. Moreover, identifying the total flow of the conversation and dividing the entire strip into multiple scenes based on the weightage of each instance created inside the conversation is not available. Therefore, the existing solutions do not often provide machine-based selection nor the automated process for customizing the user-preferred choice.

In addition, the existing system have not attempted to integrate speech input with comic strip generation as well as cartoon video generation. The systems are not advanced enough to generate animated content or video from a textual or speech input by applying natural language processing of the machine intelligence.

SUMMARY

Embodiments of the present disclosure provides technological improvements as solutions to one or more of the abovementioned technical problems recognized by the inventors in conventional systems. For example, in one embodiment, a method and system to create a comic strip based on the dynamic content.

In one aspect, a processor-implemented method to create a comic strip based on a dynamic content. The method comprising one or more steps as receiving one or more conversations, identifying a gender of one or more characters based on name of the one or more characters in the text file or dialog from the speech files using at least one gender classifier for speech input, and detecting emotions of one or more characters from the received conversation based on a polarity and a subjectivity of speech. Further, it comprises converting the received speech files into a text format using a speech to text conversion engine, selecting an environment of a plurality of scenes from the received conversation using a natural language processing, and analyzing the one or more characters using an image processing and placing the one or more characters in the selected environment. It would be appreciated that a time bound scene videos are created using a video processing and finally generating a comic strip and a comic video using the selected at least one environment, the identified one or more characters, gender of the one or more characters, and placing the dialog bubble along with the conversation text for each of the one or more identified character in the selected environment.

In another aspect, a system is configured to create a comic strip based on the dynamic content. The system comprises at least one memory storing a plurality of instructions, one or more communication interfaces, and one or more hardware processors communicatively coupled with the at least one memory, wherein the one or more hardware processors are configured to execute one or more modules. A receiving module is configured to receive one or more conversations, wherein the one or more conversations comprising of text document or a speech file. A gender identification module is configured to identify a gender of one or more characters based on a name in the text file or a dialog from the speech files using at least one gender classifier for the speech files. A detection module is configured to detect emotions of one or more characters from the received conversation based on a polarity and a subjectivity of speech, wherein the emotions from the speech are detected using a sentiment analysis model.

Further, the system comprises a speech to text conversion engine, which is configured to convert the received speech files into text. An analyzing module of the system is configured to analyze the one or more characters using an image processing to place the one or more characters in the selected environment. It is to be noted that a time bound scene videos are created using video processing technique. A comic generation module is configured to generate a comic strip and a comic video using the selected at least one environment, the identified one or more characters, gender of the one or more characters, and placing the dialog bubble along with the conversation text for each of the one or more identified character in the selected environment.

In yet another aspect, a non-transitory computer readable medium storing one or more instructions which when executed by a processor on a system, cause the processor to perform method. The method comprising one or more steps as receiving one or more conversations, identifying a gender of one or more characters based on name of the one or more characters in the text file or dialog from the speech files using at least one gender classifier for speech input, and detecting emotions of one or more characters from the received conversation based on a polarity and a subjectivity of speech. Further, it comprises converting the received speech files into a text format using a speech to text conversion engine, selecting an environment of a plurality of scenes from the received conversation using a natural language processing, and analyzing the one or more characters using an image processing and placing the one or more characters in the selected environment. It would be appreciated that a time bound scene videos are created using a video processing and finally generating a comic strip and a comic video using the selected at least one environment, the identified one or more characters, gender of the one or more characters, and placing the dialog bubble along with the conversation text for each of the one or more identified character in the selected environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a system and method to create a comic strip based on a dynamic content. Herein, input is conversation-based text or speech files. The system provides a machine-based selection of one or more characters and an automated process for customizing a user-preferred choice. The system dynamically identifies one or more scenes, one or more objects, a defined sequence and a predefined flow for generating a comic strip along with the gender of each of the one or more characters appearing in the entire conversation. It is noted that the keywords and summarization of the text is analyzed to create the situational based background image for the one or more scenes that needs to be rendered. Emotion and placement of the one or more characters in the scene is decided by the natural language processing along with emotional and sentimental analysis of voice. Based on the content of the one or more scenes, the one or more characters are placed at predetermined locations in the plain image canvas and then the text dialog is embedded into corresponding text bubbles. Once this image is obtained, it is overlaid on top of the background decided for the scene, based on the context. Further, the one or more scenes are joined into a strip of images in a pattern, which depends on the number, and order of scenes, which is decided, based on the input.

Figure 1:
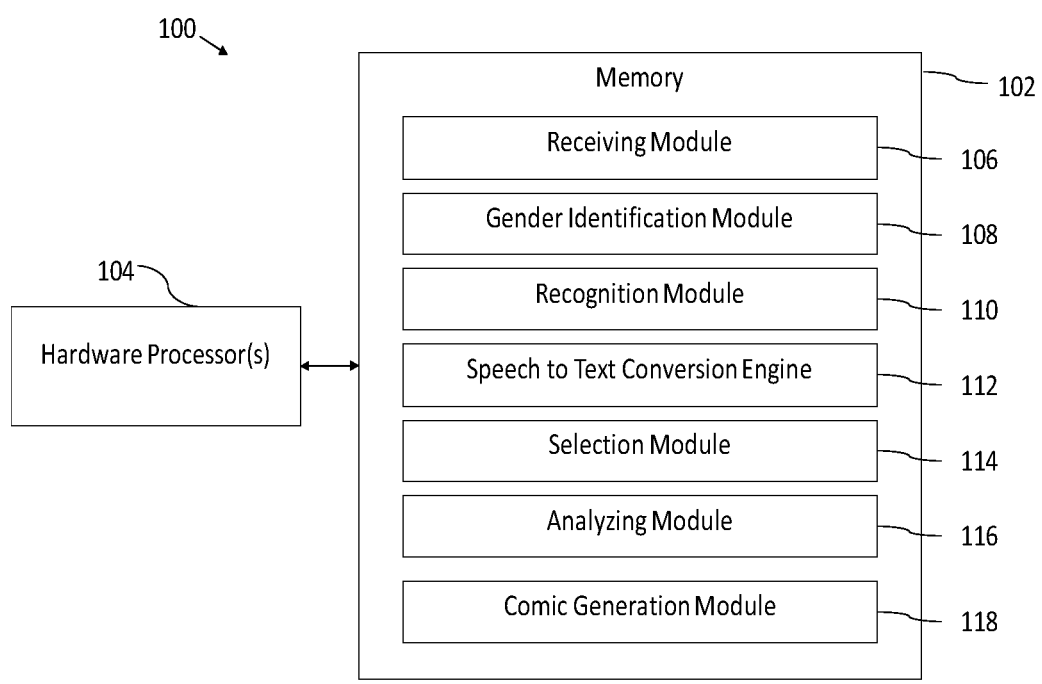
FIG. 1 illustrates a system to create a comic strip based on the dynamic content, in accordance with some embodiments of the present disclosure.
Figure 2:
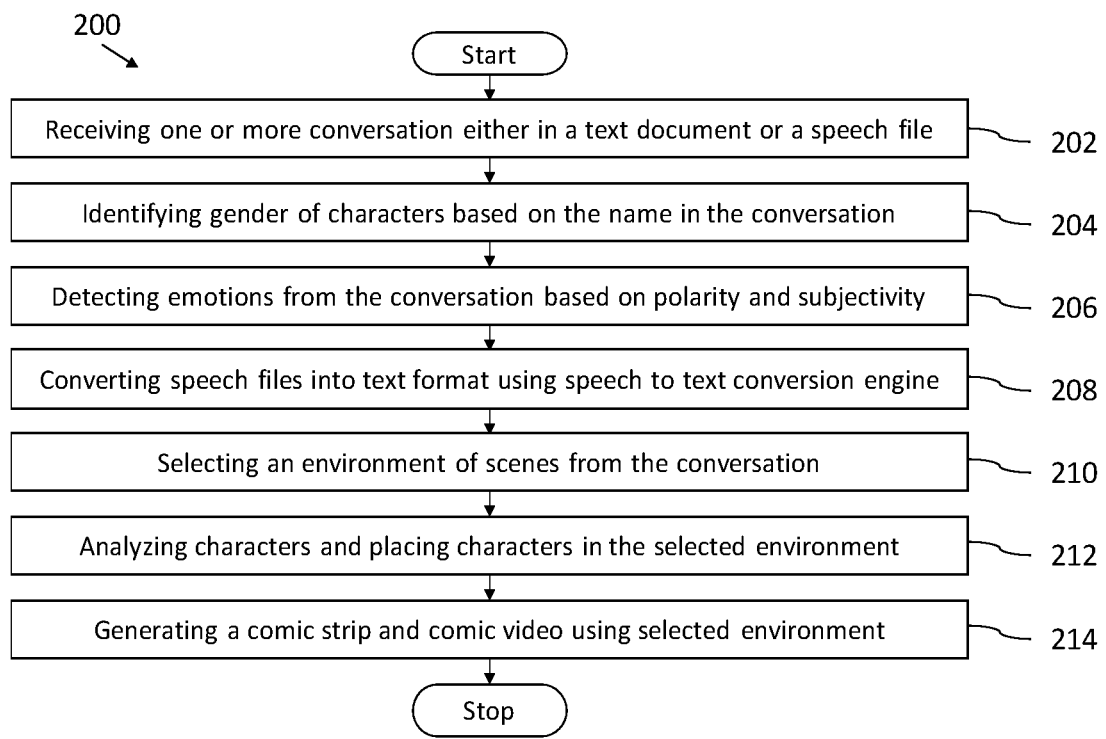
FIG. 2 is a flow diagram to illustrate a method to create a comic strip based on the dynamic content, in accordance with some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

Referring FIG. 1, wherein the system (100) is configured to create a comic strip based on the dynamic content. Herein, the input is a conversation-based text or speech files. The system dynamically identifies one or more scenes, one or more objects, and a defined sequence to determine a flow for generating the comic strip along with the gender of each of the one or more characters appearing in the entire conversation.

In one embodiment, the system (100) comprises at least one memory (102) with a plurality of instructions and one or more hardware processors (104) which are communicatively coupled with the at least one memory (102) to execute modules therein. Further, the system (100) comprises a receiving module (106), a gender identification module (108), a recognition module (110), a speech to text conversion engine (112), a selection module (114), an analyzing module (116), and a comic generation module (118).

The hardware processor (104) may be implemented as one or more microprocessors, microcomputers, microcontrollers, digital signal processors, central processing units, state machines, logic circuitries, and/or any devices that manipulate signals based on operational instructions. Among other capabilities, the hardware processor (104) is configured to fetch and execute computer-readable instructions stored in the memory (102).

In the preferred embodiment of the disclosure, the receiving module (106) of the system (100) is configured to receive one or more conversations as an input. Herein, the one or more conversations comprising of text documents or speech files from a user. It would be appreciated that the input can vary by the user, which can be a textual content or speech file. Raw information of the input is processed in the system (100) through a predefined statistic modeling technique to extract an approximate transcription of the user input. This extracted information is processed to construct a relevant content for the conversation using the natural language processing.

In the preferred embodiment of the disclosure, the gender identification module (108) of the system (100) is configured to identify a gender of one or more characters based on a name in the textual content or a dialog from the speech files using at least one gender classifier for the speech files. Herein, the gender identification module (108) is enabled to decide the one or more characters based on the information about the user like the gender, the nationality and other pronouns used in the conversational context. The gender identification module (108) is trained with machine learning algorithm to identify gender of the one or more characters.

It would be appreciated that the term 'speaker' is used herein when the input to the system is a speech. For each speaker who produces a speech as the conversation input, the system selects an avatar or character to represent the speaker in the visual space. Therefore, it can be explained that speaker in speech/voice space is represented by a character or avatar in the visual space. Similarly, in the case of textual input, each person involved can be considered as a speaker involved in the conversation. Thus, each person in the textual space is represented by the character or avatar in the visual space.

Further, the speech features of the user like Mel-frequency Cepstral Coefficients (MFCCs) is extracted and is fed into the Deep Neural Network (DNN), which helps in identifying the gender orientation of the user based on the speech input. Apart from the speech-based gender identification, the system takes various features as input into consideration, which helps in generating the hypothesis for the gender. The system (100) is trained with individual speaker voice, which helps in recognizing the speaker. It is also noted that the conversational content delivered by the speaker e.g. pronouns also contribute to the gender identification.

Herein, the speech is produced by humans and properties of the source are common for all speakers. It is the properties of the vocal tract, which is responsible for giving shape to spectrum of signal and it varies across speakers. The shape of the vocal tract governs what sound is produced and the MFCCs best represent this shape. The MFCCs are Mel-frequency Cepstral coefficients, which are some transformed values of signal in Cepstral domain. Gender identification from speech input make use of features specific to the vocal tract information of the user. Since the shape of the vocal tract is different for each person, the features of sound produced by each person differs. In addition to MFCC, other features used to identify the gender of the person includes pitch, amplitude, tone and energy levels.

Furthermore, in the case of textual input, the gender identification is made possible by identifying gender of the name of the speaker. A machine-learning model is trained on different names to identify features pertaining to the gender like occurrence of particular characters or alphabets at different positions of the name.

In the preferred embodiment of the disclosure, the recognition module (110) of the system (100) is configured to recognize emotions of one or more characters from the received conversation based on a polarity and subjectivity of speech. The emotions from the speech are detected using a sentiment analysis model. Further, the recognition module (110) is configured to analyze the processed content of the conversation, which helps in analyzing and understanding the emotions associated with the conversation by leveraging the sentiment analysis model.

It is to be that the sentiment analysis model is trained with voice of one or more known speakers. Training of the sentiment analysis model is used by collecting speech samples by multiple speakers who may or may not be involved in the conversational input. Since the dialect and vocal tone of people who speak different in different parts of the world. The emotion expressed by people differs in its features. A vast multitude of voice samples from multiple people is used to train the system to identify the emotion in the speech. Therefore, for training the emotion model, the speaker need not be known to the system. For speaker identification, which leads to character selection, the speaker's voice is trained prior to analyzing the conversation involving the specific person/speaker.

In the preferred embodiment of the disclosure, the speech to text conversion engine (112) of the system (100) is configured to convert the received speech files into text format. In order to recognize emotions, the input audio files are processed with DNN. Wherein, the DNN is trained with custom dataset, which helps in classifying the sentiments category and the audio files are transcribed into text content using the text conversion engine. Further, from the text input, the polarity and subjectivity of the content is calculated which helps in understanding the degree of emotion involved and helps in detecting and classifying the conversation activity into sentiments like happy, sad, angry and neutral.

Further, it is to be noted that during conversation, the background in each scene varies around the general identified theme of the conversation in a flawless manner to eliminate the monotony in the scenes at the same time making sure that the continuity in the scene is maintained. Moreover, the scenes are adjusted based on the width and height of each scene in such a manner to fit properly within the dimensions of the comic strip. Furthermore, in the role-based conversation, with not enough details to conclude the gender, the gender is identified based on the voice pattern or the user is given an option to specify the gender and detail of the character.

In the preferred embodiment of the disclosure, the selection module (114) of the system (100) is configured to select an environment of a plurality of scenes from the received one or more conversations using a natural language processing technique. The environment is created dynamically based on the context, content, description and flow. The objects in the environment is also decided based on the conversation pattern and conditions that are dynamically introduced as per each scene. Further, the objects in the background will be decided based on the sounds of various object apart from the speakers in the background. It would be appreciated that a noise detection is used to identify the sound samples apart from the speaker sounds. The objects, which produce the noise, is then placed in the scene. The amplitude or intensity of sound produced by the object is also used to decide the zoom level of the object in the scene.

In one example, wherein if a dog bark is heard in the background, based on the intensity of the barking sound, the dog is placed near or far away in the scene. Background angle is changes in each scene of a conversation to avoid monotony.

In the preferred embodiment of the disclosure, the analyzing module (116) of the system (100) is configured to analyze the one or more characters using an image processing and placing the one or more characters in the selected environment. Wherein a time bound, scene video is created using video processing. It would be appreciated that the raw conversational input is analyzed into the system (100), which can extract the features of the speech and the textual content. The one or more characters in the speech conversation are identified based on the frequency components and their intensity of the individual speaker is estimated which determines the position of the entity in the scenery. Based on the conversation data, the context of the conversational is estimated through NLP, which helps the system to generate a background for the scenario, which helps in the personalization of the visualization dynamically.

Further, the analysis helps in extracting one or more action points involved in the conversation using a name entity recognition. The extracted one or more actions are mapped to the action activity involved for the specified participants. This structured content is documented in the customizable format for providing better insight of the conversation. Furthermore, the one or more characters are placed at appropriate locations in a plain image canvas and then the text dialog is embedded into corresponding text bubbles present with each of the one or more characters.

In the preferred embodiment of the disclosure, the comic generation module (118) of the system (100) is configured to generate a comic strip and a comic video using the selected at least one environment, the identified one or more characters, gender of the one or more characters, and placing the dialog bubble along with the conversation text for each of the one or more identified character in the selected environment. In order to generate the comic strip, the plurality of scenes is joined into a strip of images in a pattern, which depends on number, and order of the images in the comic strip. Further, the order of the images in the comic strip depends on the conversation/textual input and overall information extracted from the speech.

It would be appreciated that the system (100) is configured to map the structured information to the individual participant, which helps in determining the user character, background scenario, their facial emotion, the position of character in the frame, and the dialogue involved in the prescribed time of activity. It provides a personalized user experience for visualizing the conversation. Further, the system (100) is configured to recognize a trained speaker in any conversational timeline using Gaussian mixture modeling. Moreover, the dynamical creation of the live which intakes structured content of the conversation and helps in personalizing the user characters in the cartoonized narration.

In another embodiment, apart from feeding the entire conversational input to the system (100), the user can apply the input through a chat engine. Wherein, the user can narrate the instruction to the system (100) for generating the one or more cartoon characters and a plurality of scenes. Through the chat, the user can describe how the one or more characters should look like, what the scenario should be etc. Detection of faces and live inclusion of faces of actual persona in the meeting to create cartoonic live experience.

Referring FIG. 2, a processor-implemented method (200) to create a comic strip based on the dynamic content. Herein, the input is conversation-based text or speech files. Further herein, one or more scenes are identified, one or more objects, a defined sequence and a flow is determined to generate the comic strip along with the gender of each of the one or more characters appearing in the entire conversation. The method comprises one or more steps as follows.

Initially, at the step (202), one or more conversations are received at a receiving module (106) of the system (100). It is to be noted that the received one or more conversations comprising of a text document or a speech file.

In the preferred embodiment of the disclosure, at the next step (204), identifying gender of one or more characters based on a name in the text file or a dialog from the speech files using at least one gender classifier for speech input at a gender identification module (108) of the system (100).

In the preferred embodiment of the disclosure, at the next step (206), recognizing emotions of one or more characters from the received conversation based on a polarity and subjectivity of the speech using a recognition module (114) of the system (100). Wherein, the emotions from the speech are detected using a sentiment analysis model.

In the preferred embodiment of the disclosure, at the next step (208), input speech files are converted into text format using a speech to text conversion engine (112) of the system (100).

In the preferred embodiment of the disclosure, at the next step (210), an environment of a plurality of scenes is selected from the received one or more conversations using the natural language processing technique.

In the preferred embodiment of the disclosure, at the next step (212), the one or more characters are analyzed at an analyzing module (116) of the system (100) using an image processing. The analyzed one or more characters are placed in a selected environment. Further herein, a time bound scene video is created with the analyzed one or more characters using video processing.

In the preferred embodiment of the disclosure, at the last step (214), generating a comic strip and a comic video using the selected environment, and the analyzed one or more characters those are placed in the selected environment. Further, placing a dialog bubble along with the conversation text for each of the one or more identified characters within the comic strip.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of dynamic environment creation based on the context, content, description and flow is not available. Background of the conversation is either kept constant or white plain screen. Sometimes it is given to the user to select and customize the scenario of the conversation. Further, the absence of a system with emotion detection from the dialog flow and character appearance change based on the emotion and sentimental value of the dialog. Moreover, identifying the total flow of the conversation and dividing the entire strip into multiple scenes based on the weightage of each instance created inside the conversation is not available. In addition to, the existing systems have not attempted to integrate speech input with comic strip generation as well as cartoon video generation. The systems are not advanced enough to generate animated content or video from a textual or speech input by applying natural language processing of the machine intelligence.

The present disclosure provides a system and method to generate a comic strip and cartoon videos. Wherein, the input can be a conversation or story-based text or speech files. The system dynamically identifies the number of scenes, objects, sequence and flow for generating the comic strip along with the number/type/category/gender of one or more characters appearing in the entire story line. Herein, keywords and summarization of the text is analyzed to create the situational based background image for the scene that needs to be rendered. Further, emotion and placement of the one or more characters in a scene is decided by the natural language processing along with voice emotional and sentimental analysis. Based on the content of the scene, the one or more characters are placed at appropriate locations in a plain image canvas and then the text dialog is embedded into corresponding text bubbles present above each character. Once this image is obtained, it is overlaid on top of an environment decided for the scene, based on the context. Moreover, different scenes are joined into a strip of images in a pattern, which depends on the number, and order of scenes, which is decided, based on the input. Furthermore, the weightage of the scenes are decided based on the content summarization, which leads to differentiated content experience management for priority-segmented contents. The comic strip can be generated as an image or as an HTML page based on the length of dialogue rendered by the characters. In addition to this, for speech input, speaker recognition is performed initially to identify the characters. The mapping between the persona and the dialog spoken is performed and delivers the content in a format (video, PDF) that is required for the context.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor-implemented method comprising:
receiving, via one or more hardware processors, one or more conversations, wherein the one or more conversations comprising of a text document or a speech file, wherein the one or more conversations is among one or more characters;
identifying, via one or more hardware processors, a gender of the one or more characters based on a name in the text file or a dialog from the speech file using at least one gender classifier for the speech files;
recognizing, via one or more hardware processors, emotions of the one or more characters from the received one or more conversations based on a polarity and subjectivity of the speech, wherein the emotions from the speech are detected using a sentiment analysis model;
converting, via one or more hardware processors, the received speech file into a text format using a speech to text conversion engine;
selecting, via one or more hardware processors, an environment of a plurality of scenes from the received one or more conversations using a natural language processing technique, wherein the environment includes objects that produce sounds and depending on intensity of the produced sounds by each of the object, the placement of each of the object at one of near to each scene or far away from each scene is determined, wherein keywords and summarization of text is analyzed to create a situational based background image for the scene and a weightage of the scene is decided based on the summarization of the text, wherein the objects in the situational based background image are decided based on the intensity of sound produced by objects apart from the speakers in the one or more conversations and the objects that produce noise is placed in the scene;
analyzing, via one or more hardware processors, the one or more characters using an image processing to place the one or more characters in the selected environment, wherein a time bound scene video is created using a video processing technique; and
generating, via one or more hardware processors, a comic strip using the selected environment, and the analyzed one or more characters are placed in the selected environment and placing a dialog bubble along with the conversation text of one of the text document or the text format of the received speech file, for each of the one or more identified characters, wherein the plurality of scenes is adjusted based on a width and a height of each scene to fit within the dimensions of the comic strip.

2. The method claimed in claim 1, wherein the sentiment analysis model is trained with voice of one or more known speakers.

3. The method claimed in claim 1, wherein the one or more characters are placed at appropriate locations in a plain image canvas based on content of the scene, prior to placing the one or more characters in the environment, and then the text dialog is embedded into corresponding text bubbles present with each of the identified one or more characters.

4. The method claimed in claim 1, wherein the plurality of scenes is joined into a strip of images in a pattern, which depends on number, and order of the images in the comic strip, further wherein order of the images in the comic strip depends on one of the conversation or the textual input and overall information extracted from the speech.

5. The method claimed in claim 1, wherein each of the plurality of scenes is converted into a video and then combined in a predefined order to form the comic video.

6. A system comprising:
at least one memory storing a plurality of instructions;
one or more hardware processors communicatively coupled with the at least one memory, wherein the one or more hardware processors are configured to:
receive one or more conversations, wherein the one or more conversations comprising of a text document or a speech file, wherein the one or more conversations is among one or more characters;
identify a gender of the one or more characters based on a name in the text file or a dialog from the speech file using at least one gender classifier for the speech files;
recognize emotions of one or more characters from the received one or more conversations based on a polarity and subjectivity of the speech, wherein the emotions from the speech are detected using a sentiment analysis model;
convert the received speech file into a text format;
select an environment of a plurality of scenes from the received one or more conversations using a natural language processing technique, wherein the environment includes objects that produce sounds and depending on intensity of the produced sounds by each of the object, the placement of each of the object at one of near to each scene or far away from each scene is determined, wherein keywords and summarization of text is analyzed to create a situational based background image for the scene and a weightage of the scene is decided based on the summarization of the text, wherein the objects in the situational based background image are decided based on the intensity of sound produced by objects apart from the speakers in the one or more conversations and the objects that produce noise is placed in the scene;
analyze the one or more characters using an image processing technique to place the one or more characters in the selected environment, wherein a time bound scene video is created using a video processing technique; and
generate a comic strip and a comic video using the selected at least one environment, and the analyzed one or more characters are placed in the selected environment and placing a dialog bubble along with the conversation text of one of the text document or the text format of the received speech file, for each of the one or more identified characters, wherein the plurality of scenes is adjusted based on a width and a height of each scene to fit within the dimensions of the comic strip.

7. The system claimed in claim 6, wherein the sentiment analysis model is trained with voice of one or more known speakers.

8. The system claimed in claim 6, wherein the one or more characters are placed at appropriate locations in a plain image canvas based on content of the scene, prior to placing the one or more characters in the environment, and then the text dialog is embedded into corresponding text bubbles present with each of the one or more characters.

9. The system claimed in claim 6, wherein the plurality of scenes is joined into a strip of images in a pattern, which depends on number, and order of the images in the comic strip, further wherein order of the images in the comic strip depends on one of the conversation or the textual input and overall information extracted from the speech.

10. The system claimed in claim 6, wherein each of the plurality of scenes is converted into a video and then combined in a predefined order to form the comic video.

11. A non-transitory computer readable medium storing one or more instructions which when executed by a processor on a system, cause the processor to perform method comprising:
receiving, via one or more hardware processors, one or more conversations, wherein the one or more conversations comprising of a text document or a speech file, wherein the one or more conversations is among one or more characters;
identifying, via one or more hardware processors, a gender of the one or more characters based on a name in the text file or a dialog from the speech file using at least one gender classifier for the speech files;
recognizing, via one or more hardware processors, emotions of the one or more characters from the received one or more conversations based on a polarity and subjectivity of the speech, wherein the emotions from the speech are detected using a sentiment analysis model;
converting, via one or more hardware processors, the received speech file into a text format using a speech to text conversion engine;
selecting, via one or more hardware processors, an environment of a plurality of scenes from the received one or more conversations using a natural language processing technique, wherein the environment includes objects that produce sounds and depending on intensity of the produced sounds by each of the object, the placement of each of the object at one of near to each scene or far away from each scene is determined, wherein keywords and summarization of text is analyzed to create a situational based background image for the scene and a weightage of the scene is decided based on the summarization of the text, wherein the objects in the situational based background image are decided based on the intensity of sound produced by objects apart from the speakers in the one or more conversations and the objects that produce noise is placed in the scene;
analyzing, via one or more hardware processors, the one or more characters using an image processing to place the one or more characters in the selected environment, wherein a time bound scene video is created using a video processing technique; and
generating, via one or more hardware processors, a comic strip using the selected environment, and the analyzed one or more characters are placed in the selected environment and placing a dialog bubble along with the conversation text of one of the text document or the text format of the received speech file, for each of the one or more identified characters, wherein the plurality of scenes is adjusted based on a width and a height of each scene to fit within the dimensions of the comic strip.

* * * * *